United States Patent
Yamada et al.

[11] Patent Number: 6,101,836
[45] Date of Patent: Aug. 15, 2000

[54] AIR CONDITIONER FOR A VEHICLE

[75] Inventors: Hideaki Yamada; Keiji Yoshimura, both of Tokyo, Japan

[73] Assignee: Mitsubishi Denki Kabushiki Kaisha, Tokyo, Japan

[21] Appl. No.: 09/181,922

[22] Filed: Oct. 29, 1998

[30] Foreign Application Priority Data

May 20, 1998 [JP] Japan ................................. 10-137900

[51] Int. Cl.⁷ .................................................. F25D 17/04
[52] U.S. Cl. ................................ 62/404; 62/428; 454/84; 454/104
[58] Field of Search ............................ 62/404, 407, 428, 62/429, 239; 454/84, 104, 105

[56] References Cited

U.S. PATENT DOCUMENTS

| | | | |
|---|---|---|---|
| 1,999,720 | 4/1935 | Davis | 454/105 |
| 2,111,905 | 3/1938 | Smith et al. | |
| 3,116,700 | 1/1964 | Aydelott | 454/84 |
| 4,062,273 | 12/1977 | O'Connor | 454/105 |
| 4,507,940 | 4/1985 | Sato et al. | 62/407 |
| 5,074,122 | 12/1991 | Babin et al. | 62/183 |
| 5,623,837 | 4/1997 | Sim | 62/419 |

*Primary Examiner*—Henry Bennett
*Assistant Examiner*—Melvin Jones
*Attorney, Agent, or Firm*—Oblon, Spivak, McClelland, Maier & Neustadt, P.C.

[57] ABSTRACT

This invention has an object of providing an air conditioner for a railway vehicle which can restrict a reduction in the introduced volume of outside air during a high-speed running of a vehicle and which can achieve lower noise. To achieve this object, the air conditioner for a railway vehicle includes an external cover 4 provided along the same surface as a vehicle surface, an air intake port 5 with a periphery provided on the external cover 4 and having a roundness in the cross-sectional configuration of an inside edge portion 12a of the intake port periphery, an air intake louver 11 disposed in the air intake port 5 to intersect a vehicle running direction, and an air exhaust port 3 for exhausting air that has been heat-exchanged, wherein an upper end surface 11a of the louver 11 is recessed from the surface of the exterior cover 4, and a cross-sectional configuration of the edge portion 11b of the upper end surface 11a has a roundness.

6 Claims, 3 Drawing Sheets

PRIOR ART

AIR CONDITIONER FOR A VEHICLE

BACKGROUND OF THE INVENTION

The present invention relates to an air conditioner for a railway vehicle running at a high speed, and relates more particularly to an air conditioner for a vehicle, such as a railway vehicle which restricts a reduction in volume of cooling wind introduced into an exterior heat exchanger and which reduces aerodynamic noise generated at the time of introducing the cooling wind.

FIGS. 7 and 8 relate respectively to a conventional air conditioner for a railway vehicle; FIG. 7 is a configuration view of an exterior portion of the conventional air conditioner for a railway vehicle viewed in a vehicle transverse direction of the railway vehicle, and FIG. 8 is a cross-sectional view of an air intake port of the exterior portion of FIG. 7 viewed along an advancing direction of the railway vehicle.

In these views, 1 denotes a vehicle side surface of a railway vehicle running at a high speed, 2 an exterior portion of an air conditioner installed in a form of being buried in a ceiling portion of the vehicle, 3 an air exhaust port provided on the vehicle side surface 1, 4 an exterior cover positioned at the same surface as a vehicle roof surface 10, 5 an air intake port provided on the exterior cover 4, 6 an air intake louver which is provided within the air intake port 5 orthogonally with the vehicle advancing direction and is also located at the same surface position as the vehicle roof surface 10, 7 an exterior wind blower installed within the exterior portion 2, for introducing cooling wind into the exterior portion 2, 8 an exterior heat exchanger, and 9 a periphery of the air intake port 5 provided on the exterior cover.

Both the exterior cover 4 and the louver 6 installed on the exterior cover 4 so as to be orthogonal with a running wind 18 are worked to have the same curvature as that of the vehicle roof surface 10 and are disposed at the same surface position as that of the vehicle roof surface 10. An edge portion 6b of an upper end surface 6a of the louver 6 and an inside edge portion 9a of the air intake port periphery 9 is bent at a right angle.

In this air conditioner, when the exterior wind blower 7 mounted in the exterior portion 2 is operated, outside air is introduced into the exterior portion 2 through the louver 6. The introduced air is heat-exchanged by the exterior heat exchanger 8, and the heat-exchanged air is exhausted to the outside from the air exhaust port 3 through a space between the vehicle side surface 1 and the exterior portion 2.

During a vehicle-running, the running wind 18 flowing from the upper stream strikes the louver 6 and the air intake port periphery 9 and is introduced into the exterior portion 2.

According to such a conventional air conditioner for a railway vehicle, the introduced volume of outside air necessary for cooling the exterior heat exchanger decreases during a high-speed running of the railway vehicle, in the case where the running speed of the vehicle becomes unusually high so that the resistance of introducing and exhausting running wind becomes larger, or in the case where an exterior wind blower having a sufficient performance cannot be employed because of downsizing and noise reduction of an external wind blower.

Further, as each of the edge portions of the upper end surface of the louver and the inside edge portion of the air intake port periphery is formed at a right angle, this angle may become a noise source of the wind.

In addition, the conventional louver must have the same curvature shape as that of the vehicle roof surface so as to be arranged at the same surface position as that of the vehicle roof surface, resulting in troublesome working for the louver and fixing of the louver.

SUMMARY OF THE INVENTION

With a view to eliminating the above problems, it is an object of the present invention to provide an air conditioner for a railway vehicle which can restrict a reduction of introduced volume of outside air during a high-speed running of a railway vehicle and which can achieve lower noise. Further, it is another object of the present invention to provide an air conditioner for a railway vehicle that can be manufactured easily.

The present invention provides an air conditioner used for a railway vehicle, comprising an external cover provided along the same surface as a vehicle surface, an air intake port provided on the external cover and defined by a periphery with an inside edge portion rounded in the cross-sectional configuration, an air intake louver disposed in the air intake port so as to intersect a vehicle running direction of the railway vehicle, and an air exhaust port for exhausting air that has been heat-exchanged, wherein an upper end surface of the louver is recessed from the surface of the exterior cover, and a cross-sectional shape of edge portions of the upper end surface has a roundness. According to this structure, it becomes possible to restrict a reduction of introduced volume of the wind necessary for cooling an exterior heat exchanger and it is also possible to reduce aerodynamic noise in this case.

Further, according to the present invention, the surface of the louver intersecting the vehicle running direction of the railway vehicle is structured straight. With this arrangement, working of the louver and fixing of the louver to the external cover can be facilitated.

Further, the air exhaust port is projected from the vehicle surface and the cross-sectional shape of an outer peripheral portion thereof has roundness. With this arrangement, the exhaust efficiency of cooling wind increases so that sufficient cooling air can be introduced into the exterior portion.

Furthermore, the air exhaust port is provided on the exterior cover. With this arrangement, the working of the vehicle side can be omitted. Thus, an air conditioner for a railway vehicle which is convenient for manufacturing and handling can be obtained.

Figure 1:
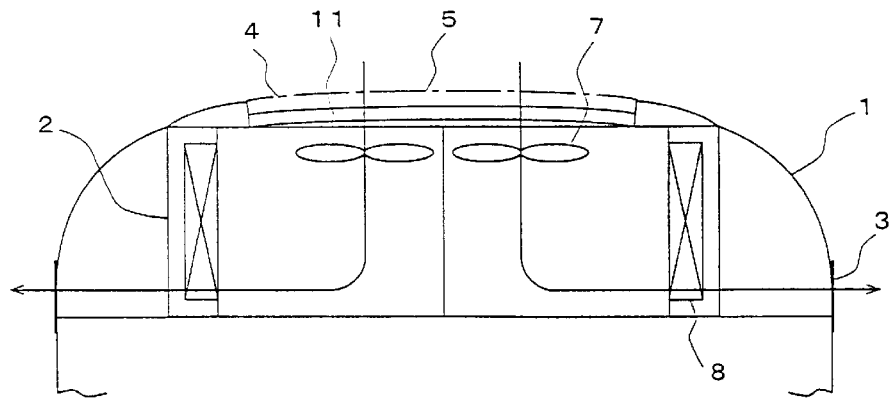
FIG. 1 is a configuration view of an exterior portion of an air conditioner for a railway vehicle relating to a first embodiment of the present invention viewed in a vehicle transverse direction.

FIG. S is a modified view of FIG. 1 having a different position of the air exhaust port and a different shape of a louver.

Figure 6:
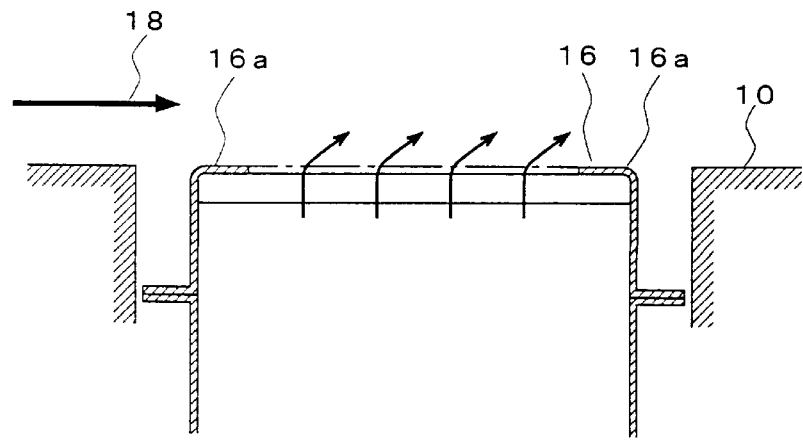

FIG. 6 is a cross-sectional view cut in a vehicle running direction, of the air exhaust port provided in the exterior portion of the air conditioner for a railway vehicle relating to a second embodiment of the present invention.

Figure 7:
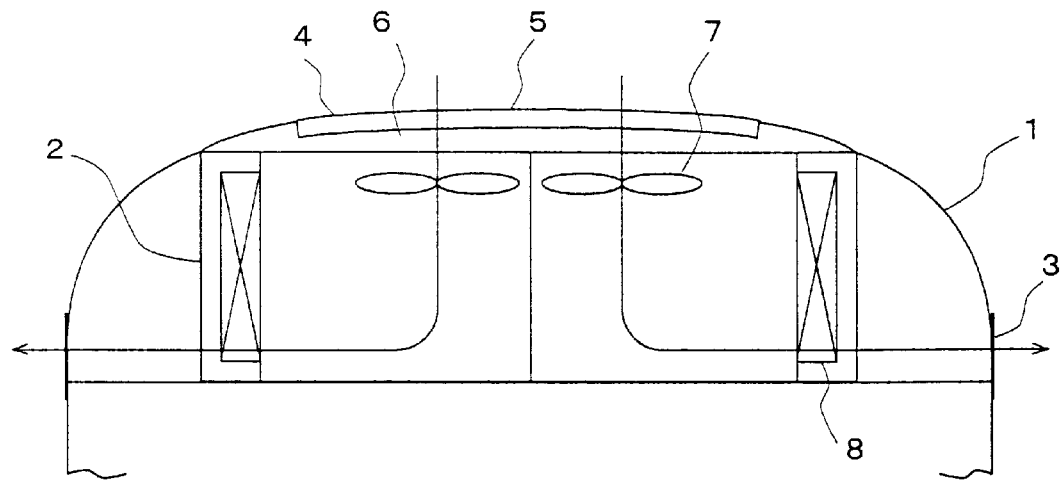

FIG. 7 is a configuration view of an exterior portion of a conventional air conditioner for a railway vehicle viewed in a vehicle transverse direction.

Figure 8:
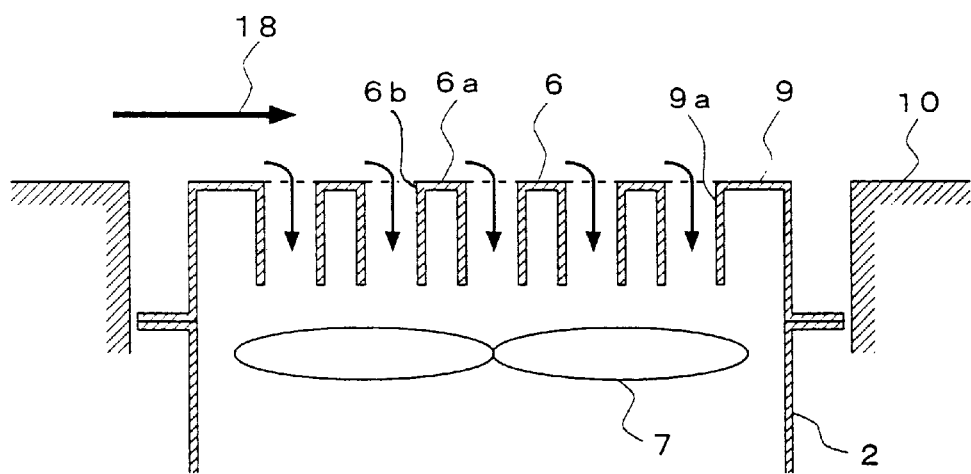

FIG. 8 is a cross-sectional view, in a vehicle running direction, of an air intake port of the exterior portion of FIG. 7.

DETAILED DESCRIPTION OF THE PREFERRED EMBODIMENTS

First Embodiment

A first embodiment of the present invention will be explained below with reference to FIGS. 1 to 5.

In FIG. 1, 1 denotes a vehicle side surface of a railway vehicle running at a high speed, 2 an exterior portion of an air conditioner installed in a form of being buried in a ceiling portion of the vehicle, 3 an air exhaust port provided on the vehicle side surface 1, 4 an exterior cover positioned at the same surface as a vehicle roof surface, 5 an air intake port provided on the exterior cover 4, 11 a louver provided within the air intake port 5 and having the same curvature shape as that of the vehicle roof surface, 7 an exterior wind blower installed within the exterior portion 2, for introducing cooling wind into the exterior portion 2, and 8 an exterior heat exchanger.

Figure 2:
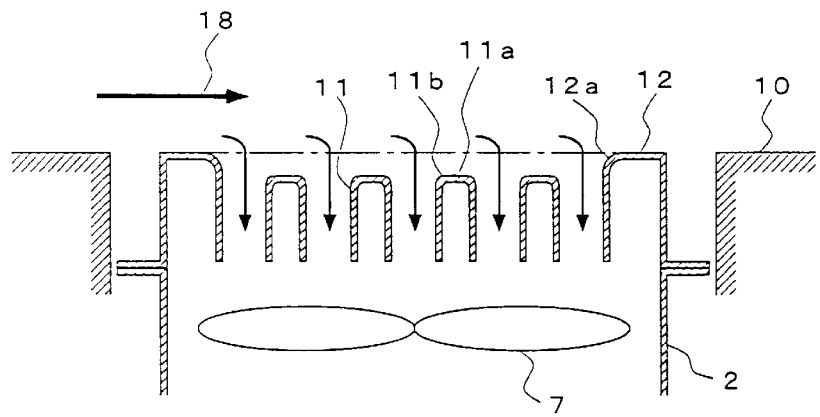
FIG. 2 is a cross-sectional view cut in a vehicle running direction, of an air intake port of the exterior portion of FIG. 1.

In FIG. 2, 10 denotes the vehicle roof surface, 11 the louver provided within the air intake port 5 almost orthogonally with a vehicle advancing direction and having an upper end surface 11a located at a position recessed from a surface position of the vehicle roof surface 10, and 12 a periphery of the air intake port 5 provided on the exterior cover 4. An edge portion 1 lb of the upper end surface 11 a of the louver 11 is formed to have a roundness as shown in the figure, and an inside edge portion 12a of the air intake port periphery 12 is also formed to have a roundness as shown in the figure.

According to this air conditioner, when the exterior wind blower 7 is operated during a high-speed running of the railway vehicle, cooling wind introduced into the exterior portion 2 passes through the louver 11 and the exterior heat exchanger 8, and is exhausted to the outside from the air exhaust port 3 through a space between the vehicle side surface 1 and the exterior portion 2.

Further, as the upper end surface 11 a of the louver is located at a position lower than the vehicle roof surface 10, running wind 18 is deflected to the louver 11 side and sufficient cooling wind can be introduced into the exterior portion 2 even during a high-speed running of the railway vehicle.

Figure 3:
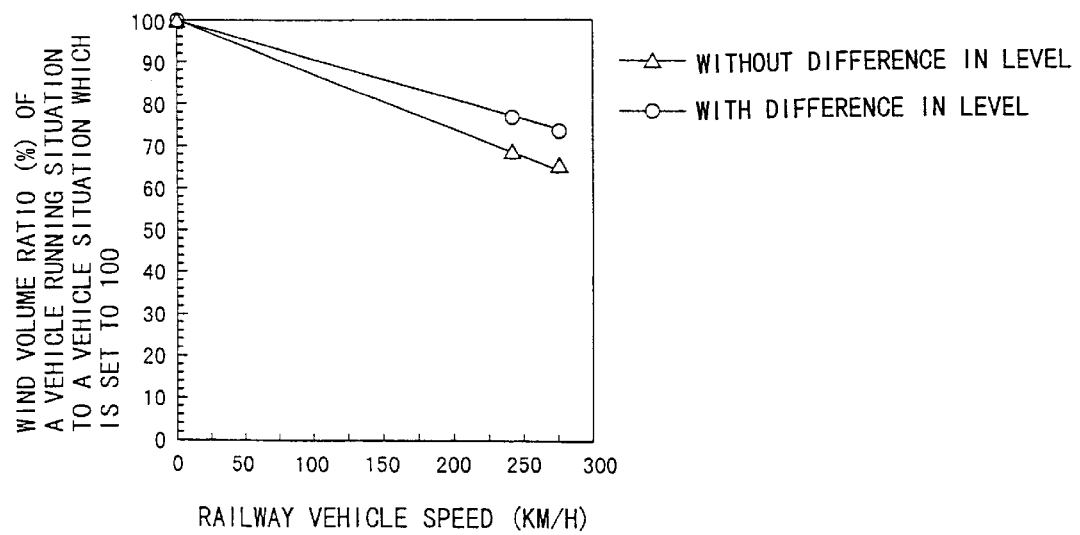
FIG. 3 is a graph for showing relationships between a vehicle running speed, a louver position and volume of wind introduced into the exterior portion.

FIG. 3 shows a result of a comparison of effects obtained in a case where there is a height difference between the upper end surface of the louver and the vehicle roof surface and a case where the upper end surface of the louver and the vehicle roof surface are arranged at the same surface level. In FIG. 3, a horizontal axis represents a vehicle running speed and a vertical axis represents a wind volume ratio which is set to 100 at the vehicle running speed of zero. A triangle mark (Δ) shows a case where there is no height difference between the upper end surface of the louver and the vehicle roof surface and a circle mark (○) shows a case where the height difference is 30 mm. This graph shows that when the vehicle is running at 250 km/h, the wind volume ratio is about 68% in the case where there is no height difference and the wind volume ratio is about 78% in the case where there is a height difference. It is known from this graph that a reduction in the introduced wind volume is restricted to a better extent in the case where there is a height difference between the upper end surface of the louver and the vehicle roof surface as compared with the case where there is no height difference.

A structure for lowering aerodynamic noise will be explained next. When running wind is introduced into the external portion 2 due to a high vehicle running speed, the wind strikes the edge portion 11b of the upper end surface 11a of the louver 11 and the inside edge portion 12a of the air intake port periphery 12 so as to generate aerodynamic noise. Accordingly, in the present invention, these edge portions are rounded to restrict a generation of noise from these portions.

Figure 5:
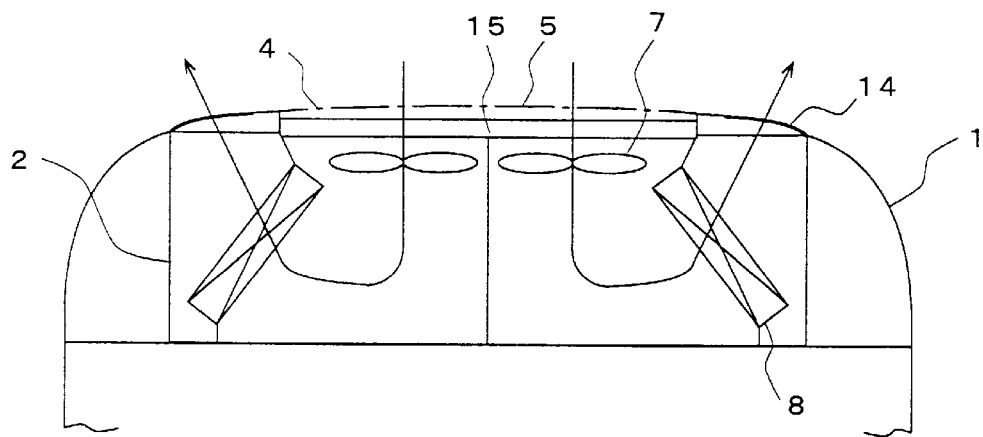

Instead of the louver 11 having the same curvature shape as that of the vehicle roof surface 10, there may also be employed a straight louver 15 as shown in FIG. 5 in which the louver 15 constitutes a chord for an arc of a curved surface of the exterior cover 4 that is located at the same surface position as that of vehicle roof surface 10. In other words, the plane of the louver 15 in the direction of intersecting the vehicle running direction is structured straight. With this arrangement, it is possible to reduce process for working the louver itself and work of fixing the louver 15 to the exterior cover 4 as well as to restrict a reduction of the introduced volume of wind.

Figure 4:
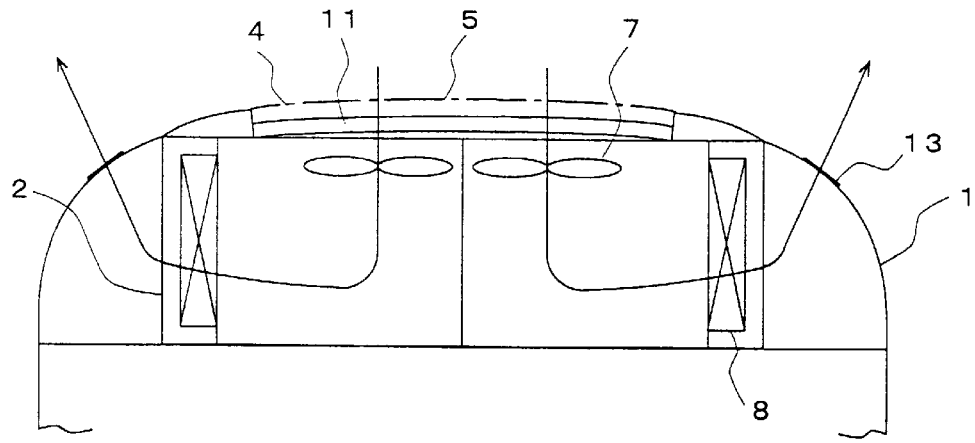
FIG. 4 is a modified view of FIG. 1 having a different position of an air exhaust port.

Further, the air exhaust port 13 can also be installed at other positions. As shown in FIG. 4, when the air exhaust port 13 is provided on a curved surface portion of the vehicle side surface 1 between the vehicle roof surface 10 and a plane surface portion of the vehicle side surface 1, a cooling air exhausting effect can be improved and more volume of cooling air can be introduced. This is because an air pressure during the running is smaller on the curved surface portion than the plane surface portion of the vehicle side surface 1. Further, as shown in FIG. 5, there may also be provided an air exhaust port 14 in the exterior cover 4 to reduce a processing work on the vehicle side as far as possible.

Second Embodiment

FIG. 6 is a cross-sectional view cut in a vehicle running direction, of an air exhaust port provided in an exterior portion of an air conditioner for a railway vehicle relating to a second embodiment of the present invention. In this drawing, 16 denotes a periphery of an air exhaust port provided on the exterior cover 4 so as to be projected from the vehicle roof surface 10, wherein its outside edge portion 16a stuck by running wind 18 is rounded.

With this arrangement, as the air exhaust port periphery 16 is projected from the vehicle roof surface 10, an area of negative pressure is generated and an exhausting effect of cooling air can be improved. Accordingly, it is possible to take in sufficient cooling air even during a high-speed running of the railway vehicle. Further, as the outside edge portion 16a of the air exhaust port periphery which running wind strikes is rounded, aerodynamic noise can also be reduced.

What is claimed is:

1. An air conditioner used for a vehicle, comprising:
   an exterior cover provided along the same surface as a vehicle surface;
   an air intake port defined by a periphery provided on the external cover for taking air in, said periphery having an inside edge rounded in a cross-sectional configuration;
   an air intake louver disposed in the air intake port so as to intersect a vehicle running direction;
   a heat-exchanger connected to the air intake port; and
   an air exhaust port connected to the heat-exchanger for exhausting air, wherein the louver has an upper end surface that is recessed from the surface of the exterior cover, and the upper end surface includes edge portions having a rounded cross-sectional configuration.

2. An air conditioner for a vehicle according to claim 1, wherein the surface of the louver intersecting the vehicle running direction is structured straight.

3. An air conditioner for a vehicle according to claim 2, wherein the air exhaust port is provided on the exterior cover.

4. An air conditioner for a vehicle according to claim 3, wherein a periphery of the air exhaust port is projected from the vehicle surface and the cross-sectional configuration of an outside edge portion of the air exhaust port has a roundness.

5. An air conditioner for a vehicle according to claim 1, wherein the air exhaust port is provided on the exterior cover.

6. An air conditioner for a vehicle according to claim 5, wherein a periphery of the air exhaust port is projected from the vehicle surface and the cross-sectional configuration of an outside edge portion of the air exhaust port has a roundness.

* * * * *